June 4, 1968  KENZO AIHARA ET AL  3,386,315
INDEX MECHANISM FOR ROTARY TOOL REST ON LATHE
Filed Jan. 10, 1966
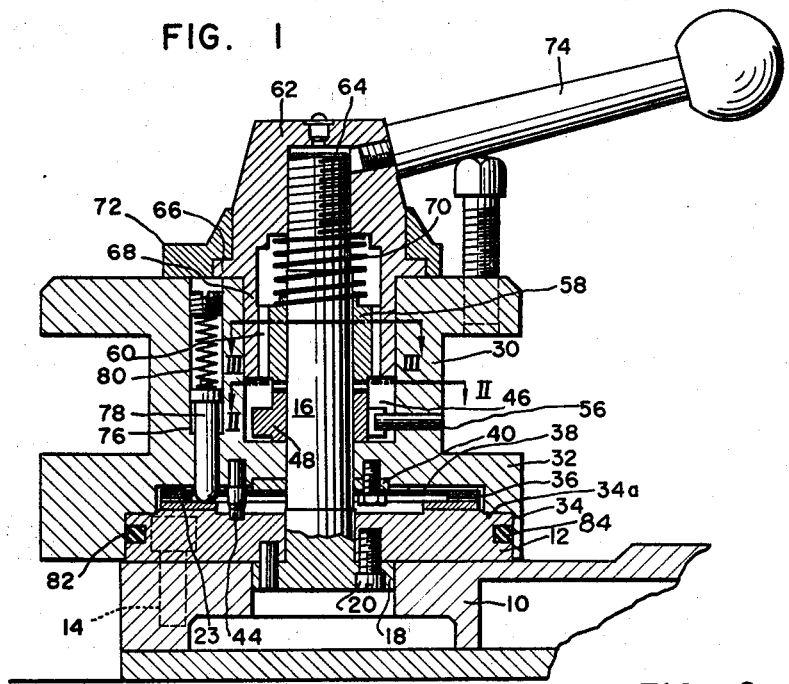
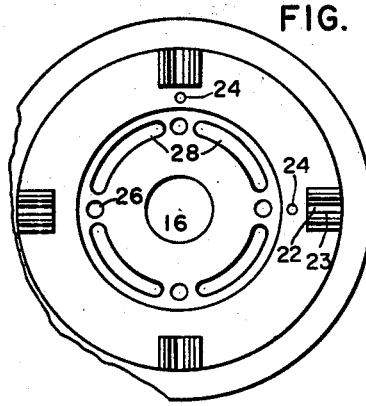
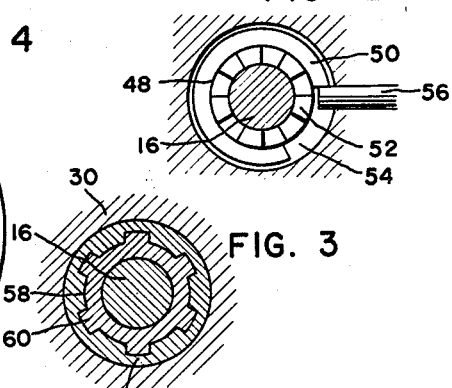
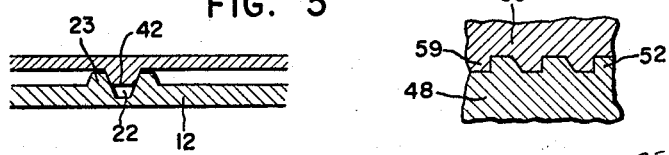
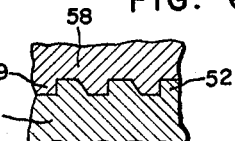

United States Patent Office 3,386,315
Patented June 4, 1968

3,386,315
INDEX MECHANISM FOR ROTARY TOOL
REST ON LATHE
Kenzo Aihara and Kazuo Takaya, Tokyo, Japan, assignors to Ikegai Tekko Kabushiki Kaisha, Tokyo, Japan
Filed Jan. 10, 1966, Ser. No. 519,802
1 Claim. (Cl. 74—813)

ABSTRACT OF THE DISCLOSURE

A rotary tool rest for a lathe having an index mechanism with an index disk which has four radial undulations disposed at angular intervals of 90 degrees on the outer peripheral portion. A thin disk of resilient material is fixed at the central portion to the lower surface of a tool rest facing the index disk through a space with an annulus interposed between them and has four radial ridges disposed at angular intervals of 90 degrees in such positions that they can selectively engage the undulations on the index disk. The tool rest is locked to the index disk through engagement of the ridges with the undulations.

---

This invention relates to a rotary tool rest on a lathe and more particularly to an index mechanism for positioning such a tool rest.

In the conventional type of index mechanism for positioning a rotary tool rest on a lathe, it has been commonly practiced to removably fit a single positioning pin into a selected one of positioning holes formed on the tool rest for positioning purposes. The positioning pin and holes might be subjected to wear and tear during long service resulting in the pin being loosely fitted into any selected hole. Under these circumstances, the desired index position of the tool rest can not be precisely determined and a low degree of index accuracy results. Alternatively a highly degree of index accuracy can be attained only by using a very complicated mechanism.

Accordingly, it is an object of the invention to provide an improved index mechanism for positioning a rotary tool rest on a lathe, simple in construction and reliable in operation with a very high degree of index accuracy.

This object is achieved by an index mechanism for positioning a rotary tool rest of square shape on a lathe, comprising an index table disposed below said tool rest, said table and tool rest having a space therebetween, four radial undulations disposed at angular intervals of substantially 90 degrees on the outer peripheral portion of said index table, a circular sheet of resilient material within said space fixed to the lower surface of said tool rest, an annular member between said circular sheet and said lower surface, and four radial ridges disposed at angular intervals of substantially 90 degrees on that surface of said circular disc facing said index table at positions such that they can selectively engage said radial undulations, the arrangement being such that said ridges engage opposing grooves to lock said tool rest to said index table while the outer peripheral portion of said resilient sheet is slightly flexed toward the tool rest.

The invention as to its organization and its mode of operation as well as other objects and advantages thereof will become more readily apparent from the following detailed description taken in conjunction with the accompanying drawing in which:

FIG. 1 is a longitudinal sectional view of an index mechanism constructed in accordance with the teachings of the invention;

FIG. 2 is a sectional view taken along the line of II–II of FIG. 1;

FIG. 3 is a sectional view taken along the line of III–III of FIG 1;

FIG. 4 is a bottom plan view of an index table illustrated in FIGS. 1 through 3;

FIG. 5 is a fragmental sectional view illustrating profiles of ridges and groove for engaging the index member with a resilient sheet embodying the teachings of the invention; and FIG. 6 is a fragmental sectional view illustrating clutch teeth used with the present invention.

Referring now to FIG 1, there is illustrated an index mechanism constructed in accordance with the teachings of the invention. An arrangement illustrated comprises a tool slide 10, a disk-shaped index table 12 rigidly secured to the tool slide 10 by a plurality of bolts 14 one of which is illustrated in FIG. 1, and a spindle 16 vertically extending through a central bore formed in the index table 12 having at the lower end a flange or a head 18 firmly secured on the lower surface of the index table 12 by a plurality of screws 20 one of which is shown in FIG. 1.

As shown in FIG. 4, the disk-shaped index table 12 is provided on the peripheral portion of the upper face or that face remote from the tool slide 10 with four sets of undulations disposed at substantially equal angular intervals of 90 degrees about the axis of the spindle 16. Each of the undulation sets includes a radial groove 22 formed on the upper face of the index table 12 and a ridge 23 disposed on each side of the groove. The index table 12 further has four small recesses 24 of circular shape formed thereon opposite the inner ends of the grooves 22 respectively on a circle having its center on the axis of the spindle 16, and four holes 26 substantially aligned with the recesses 24 and hence the grooves 23 and four arcuate slot portions 28 each disposed between any two adjacent holes 26 and substantially angularly coextensive with a circumferential portion on the table between two adjacent undulation sets, the holes and arcuate slot portions lying on a common circle whose center lies also on the axis of the spindle 16 for a purpose which will be apparent hereinafter. The spindle 16 loosely extends through a central opening formed in a tool rest of square shape generally designated by the reference numeral 30 and disposed above the index table 12. The tool rest 30 has its lower portion in the form of a square flange 32 provided on the lower surface with a stepped circular opening 34 serving to loosely fit the tool rest onto the disk-shaped index table 12 for rotation and rests on the table 12 by having an annular step 34a in contact with the upper surface of the index table 12 to form a circular space 36 between the tool rest and the index table.

Disposed within the circular space 36 is a disk of resilient material 38 such as a leaf spring screwed to the top surface of the space 36 or the lower surface of the tool rest 30 through an annulus 40 so as to be axially flexible. The spindle 16 also loosely extends through the disk 38. The material of the disk 38 may be spring steel or any other suitable resilient material. It has been found that JIS Sup6 type steel approximately corresponding to ASTM A59–49 type steel or DIN 55Si7 or 56Si7 type steel can be used with a satisfactory result. Such steel was entirely hardened to a Shore hardness of from 60 to 65 by multi-quenching treatment. The resilient disk 38 is provided on that face facing the index table 12 with four radial ridges or teeth 42 disposed at substantially equal angular intervals of 90 degrees and capable of engaging the grooves 22 on the index table 12. Also a safety pin 44 extends from the lower surface of the tool rest 30 or the upper wall of the space 36 through the resilient disk 38 into the above-mentioned space 36 and is adapted to be insertable in a selected one of the holes 26 and arcuate portions 28 for a purpose as will be apparent hereinafter.

The tool rest 30 also has a cylindrical chamber 46 formed on the upper portion in which a clutch element 48 including a flange or a cam 50 (see FIG. 2) is rotatably mounted on the spindle 16. The clutch element 48 has a plurality of dog teeth or pawls 52 formed on the upper end face and inclined in one direction (see FIG. 6) while the flange 50 is provided with a circumferential notch 54 extending through a predetermined angle in this case an angle of approximately 51 degrees. A short cross rod 56 is rigidly secured to the side wall of the chamber 46 and hence of the tool rest 30 and extends into the region of the notch 54.

Disposed on the clutch element 48 is another clutch element in the form of a tubular sleeve 58 rotatably mounted on the spindle 16 and provided on the lower end face with a plurality of dog teeth or pawls 59 complementary in shape to the dog teeth 52 to mesh with the latter. This permits relative sliding movement of both clutch elements in the one direction. Also as shown in FIG. 3, the sleeve 58 has a plurality of splines 60 formed on the outer peripheral surface.

A cap block generally designated by the reference numeral 62 is screwed onto the upper screw-threaded end portion 64 of the spindle 16 and includes a flange 66 seating on the upper surface of the tool rest 30 to close the chamber 64 and a pendent hollow cylindrical portion 68 rotatably fitted into the cylindrical chamber 46. The hollow cylindrical member 68 has its internal peripheral surface complementary in shape to the outer peripheral surface of the sleeve 58 including the splines 60 and fitted onto the latter for relative vertical sliding movement. Disposed within the interior of the hollow cylindrical portion 68 and between its upper end and the upper end of the sleeve 58 is a helical spring 70 for normally pushing the sleeve 58 against the clutch element 48. The flange 66 is encircled by an annular cover 72 secured on the upper surface of the tool rest 30 but permitting relative rotational movement between the latter and the cap block 62. In order to rotate the cap block 62 about the axis of the spindle 16, an operating rod 74 is screwed into the upper portion of the cap block 62. For the purpose of rapidly rotating the cap block 62 the end portion 64 of the spindle 16 is preferably of a multiple thread screw type having a high pitch.

The tool rest 30 is provided on one side with a vertical bore 76 into which a positioning pin 78 is resiliently inserted. The bore 76 is closed by the cover 72 and the flange 66. The positioning pin 78 is forced downwardly by the action of a helical spring 80 disposed within the bore 76 and upon the pin until the lower end of the pin projects from the vertical bore 76 through the resilient disk 38 and into contact with the upper surface of the index table 12. Therefore if the position pin 78 is located above any one of the recesses 24 the same can be fitted into the particular recess whereupon the pin acts as a temporarily retaining pin.

In FIG. 1 wherein the tool rest is shown as being in its locked position, it is assumed that the operating rod 74 is rotated in the counterclockwise direction as viewed from the top of the tool rest. Then the cap block 62 is rotated while using due to the multiple thread screw 64 on the spindle 16 whereby the flange 66 of the cap block 62 raises the annular cover 72 and therefore the tool rest to which the cover is rigidly secured. This upward movement of the tool rest causes the step 34a in the opening 34 to disengage from the index table 12 with result that the ridges 42 on the resilient disk 38 are moved away from the associated grooves 22.

After the operating rod 74 has been rotated from its initial position through an angle determined by the angular length of the notch 54 and the diameter of the cross rod 56, in this example an angle of 51 degrees and 30 minutes in the direction as abovedescribed, the cam 50 abuts against the cross rod 56 secured to the tool rest. Then a further rotational movement of the operating rod 74 causes rotational movement of the cam and hence of the tool rest. At the instant the tool rest has been rotated from its initial position through an angle of approximately 90 degrees, the positioning pin 78 engages the subsequent depression 24 whereupon the tool rest 30 is temporarily held stationary with respect to the index table 12.

Under these circumstances, the operating rod 74 can be rotated reversely or in the clockwise direction as viewed from the top of the tool rest to cause the cap block 62 to depress the tool rest 30 through the flange 66. At that time, the safety pin 44 falls into the hole 26 positioned directly below the same and does not prevent downward movement of the tool rest. Thus it will be appreciated that the tool rest continues to be depressed without rotational movement. As the tool rest is depressed the individual ridges 42 on the resilient disk 38 begin to engage the adjacent grooves 22 on the index table 12. A further depression of the tool rest causes the ridges 42 to be brought into intimate engagement with the grooves 22 with the result that the tool rest is locked to the index table 12 in a position relative to the index table which is positively determined by a pair of diameters of the disk 38 in the horizontal and vertical directions as viewed in FIG. 4 regardless of the position of the axis of the spindle 16. The resilient disk 38 begins to be slightly bent toward the tool rest while the cam 50 is reversely rotated by the cap block 62 through the sleeve 58 and the clutch element 48 until one end of the notch on the cam abuts against the cross rod 56. A further rotational movement of the cam 50 causes the tool rest to be temporarily detained to be prevented from additionally rotating. Thus the dog pawls 52 on the clutch element 40 disengage from the associated dog pawls 59 on the sleeve 58 to permit the leaf spring 38 to be raised thereby to disengage the tool rest from the index table. Therefore the tool rest is prevented from effecting additional rotation. In this way the step 34a can be eventually locked on the index table 12.

Where the ridges 42 on the positioning resilient disk 38 and the associated ridges 22 on the index table 12 are superposed the safety pin 44 first abuts against the upper surface of the index table 12 before the same emerges from the particular slot 28 to cause the ridges 22 to abut against the adjacent ridges 42 thereby to prevent a further downward movement of the tool rest and therefore any damage to the latter. In any position other than that just described, locking may be freely made.

As shown in FIG. 1, the index table 12 may be preferably provided on the outer periphery with a circumferential groove 82 in which an O-ring 84 is disposed in order to prevent ingress of dust into the space 36 caused by upward and downward movements of the tool rest relative to the index table.

The present invention has several advantages. For example an angular position of the tool rest relative to the index disk can be positively and precisely determined through engagement of the ridges 42 on the resilient disk 38 with the grooves 22 on the index disk 12, that is, by a pair of orthogonal lines each passing through the axes of the opposite ridges or grooves independently of the axis of the spindle. The outer peripheral portion of the resilient disk will be axially somewhat flexed toward the tool rest. Therefore those ridges and grooves need not be machined with a high degree of accuracy and the various precisely indexed positions of the tool rest can be repeatedly and perfectly reproduced. Further since the tool rest can be rapidly rotated by utilizing the spindle having the multiple thread screw with a large pitch the operating rod is required only to be rotated through a small angle to cause the dog pawls on the clutch elements to disengage from each other to permit automatic rotational movement of the tool rest. Thus the machining operation can be very easily performed. In addition such operation is very conveniently performed because the tool rest is adapted to be locked at any desired angular position relative to the index table except for the case where the positioning ridges on the resilient disk and the index table are superposed. In the latter case the safety pin engages a selected one of the holes and arcuate slots on the index table thereby to prevent any damage to the positioning ridges due to superposition thereof.

While the invention has been illustrated and described in conjunction with a preferred embodiment thereof it is to be understood that various changes in the details of construction and the combination and arrangement of parts can be made without departing from the spirit and scope of the invention. For example, clutch means disposed within the tool rest may be omitted if desired. In this case, after the tool rest has been released from the index table, the same can be manually rotated in either of the opposite directions. Also the invention has been described in terms of two pairs of diametrically opposed sets of positioning ridges, but it will be readily understood that in order to position the tool rest it is required only to use three sets of ridges disposed at the substantially equal angular intervals. Therefore three or more than four sets of positioning ridges may be used. Also instead of the circular plate of resilient material, any desired shape of rotation of symmetry such as a star shape may be used. Alternatively a stack of resilient laminations may be used in any desired shape. In addition, the resilient plate may be provided on the index table rather than on the tool rest, if desired.

What we claim is:

1. An index mechanism for positioning a rotary tool rest of square shape on a lathe, comprising an index table disposed below said tool rest, said table and tool rest having a space therebetween, four radial undulations disposed at angular intervals of substantially 90 degrees on the outer peripheral portion of said index table, a circular sheet of resilient material within said space fixed to the lower surface of said tool rest, an annular member between said circular sheet and said lower surface, and four radial ridges disposed at angular intervals of substantially 90 degrees on that surface of said circular disk facing said index table at positions such that they can selectively engage said radial undulations, the arrangement being such that said ridges engage opposing grooves to lock said tool rest to said index table while the outer peripheral portion of said resilient sheet is slightly flexed toward the tool rest.

References Cited

UNITED STATES PATENTS

| | | | |
|---|---|---|---|
| 1,690,568 | 11/1928 | Bullard | 74—826 |
| 2,364,329 | 12/1944 | Waldo et al. | 74—826 X |
| 3,049,032 | 8/1962 | Schabot | 74—826 X |
| 3,054,333 | 9/1962 | Brainard et al. | 74—826 X |
| 3,213,722 | 10/1965 | Maglica | 74—826 X |

FOREIGN PATENTS 682,793   11/1952   Great Britain.

FRED C. MATTERN, Jr., *Primary Examiner.*

J. S. CORNETTE, F. D. SHOEMAKER,
*Assistant Examiners.*